United States Patent [19]

Chojnowski

[11] 4,139,960

[45] Feb. 20, 1979

[54] FISHING BOB AND HOOK SETTING DEVICE

[76] Inventor: Stanley Chojnowski, 328 Chestnut St., New Britain, Conn. 06051

[21] Appl. No.: 783,602

[22] Filed: Apr. 1, 1977

[51] Int. Cl.² .............................................. A01K 97/12
[52] U.S. Cl. ......................................... 43/15; 43/43.1
[58] Field of Search ...................... 43/15, 16, 17, 43.1, 43/43.14, 44.94

[56] References Cited

U.S. PATENT DOCUMENTS

| 542,917 | 7/1895 | Bardskey | 43/15 |
|---|---|---|---|
| 2,153,339 | 4/1939 | Reeves et al. | 43/15 |
| 2,239,911 | 4/1941 | Dorn | 43/15 |
| 2,497,356 | 2/1950 | Hagen | 43/43.1 |
| 2,537,321 | 1/1951 | Walton | 43/43.1 |
| 2,598,140 | 5/1952 | Shukites | 43/43.1 |
| 2,884,734 | 5/1959 | Binkowski | 43/43.1 |
| 3,401,483 | 9/1968 | Bellah et al. | 43/43.1 |
| 4,043,069 | 8/1977 | Zahner | 43/15 |

Primary Examiner—Edward M. Coven
Attorney, Agent, or Firm—McCormick, Paulding & Huber

[57] ABSTRACT

A fishing bob and hook setting device comprising a bent wire member having a generally L-shape with vertical and horizontal sections, an eye at the junction of the two sections, and an eye at the free end of the horizontal section. The vertical section adjustably mounts a bouyant member having a flat drag surface at the top and a weight therebeneath. The fishing line is threaded through the eye at the junction of the vertical and horizontal sections of the wire and is secured to the eye at the free end of the horizontal section to depend therefrom with a hook thereon. A slight downward pull by a fish tips the device to its side where the drag surface engages the water and on the occurrence of further pulling action by the fish sets the hook. The bouyant member may be frictionally adjusted on the vertical section or, the section may be threaded for vertical adjustment of a buoyant member. The horizontal section or arm of the wire may also be bent for fine adjustment.

9 Claims, 4 Drawing Figures

FISHING BOB AND HOOK SETTING DEVICE

BACKGROUND OF THE INVENTION

Various fishing bobs and hook setting devices have been heretofore available but have not been completely satisfactory in operation or in complexity of construction. Spring devices to provide a sudden jerk for a hook setting operation have been utilized but a relatively complex and expensive product results. Other hook setting devices have failed to meet wide-spread commercial acceptance due to lack of durability and dependability in use, complexity of construction and resulting high cost of manufacture.

SUMMARY OF THE INVENTION

It is the general object of the present invention to provide an improved fishing bob and hook setting device which exhibits a simplicity of construction conducive to low-cost quantity production and which yet exhibits a high degree of efficiency in its operation, and which is capable of adjustment for fine tuning of its hook setting function.

In fulfillment of this object, a fishing bob and hook setting device is provided with a boyant member which has at least one surface adapted to create a substantial drag in movement through water. The bouyant member is preferably adapted to float in an upright first position where its drag surface is inoperative, and is adapted to be tipped to a second or side position where its drag surface is operative to impede movement of the member through the water and thus to set the hook in the mouth of the fish. A positioning means is provided for maintaining the bouyant member in its first or upright position and preferably comprises a weight disposed beneath the member. A line connecting means is opeatively associated with the bouyant member and is so positioned that a slight downward fish pull on a line connected thereto readily overcomes the effect of the positioning means and moves the bouyant member to its second or side position. The connecting means preferably comprises an eye at the end of a horizontal section or arm of a bent wire member which is thus offset horizontally to readily tilt or tip the device and to render the drag surface operative. Relative vertical adjustment between the bouyant member and the line connecting means is preferably provided and may be accomplished by vertical adjustment of the bouyant member along the vertical section of the bent wire body member and/or by vertical adjustment of the line connecting means or eye by bending the wire. Preferably, the line running to the fisherman passes through a second eye disposed above and approximately centered over the bouyant member.

DETAILED DESCRIPTION OF PREFERRED EMBODIMENTS

Figure 1:
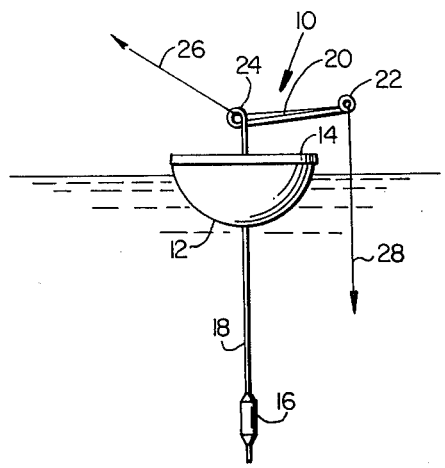
FIG. 1 of the drawings is a side elevational view illustrating the improved fishing bob and hook setting device of the present invention in a first or upright position.

Referring particularly to FIG. 1, it will be observed that an improved fishing bob and hook setting device indicated generally at 10 comprises a bouyant member 12 illustrated in a semi-spherical configuration. The shape of the member 12 may vary substantially within the scope of the invention and its mode of construction may also vary but it is important to note that a drag surface 14 is provided thereon. The surface 14 is shown as a flat surface but may also vary in configuration. It will be apparent that a concave surface moving through water will also provide a substantial drag as well as other surfaces. Streamlining is to be avoided so as not to minimize the drag or resistance provided by the surface 14 in movement of the bouyant member through the water.

The bouyant member 12 has first and second positions repectively placing the drag surface 14 in an inoperative and operative attitudes. That is, the member 12 shown is upright in its first position and the surface 14 is approximately horizontal and directed upwardly but, when the bouyant member 12 is tipped or tilted on its side as in FIG. 2, the surface 14 engages the water and is partially submerged. Any movement of the bouyant member 12 rightwardly or in an angular direction rightwardly and downwardly will cause the drag surface to impede movement of the member 12 through the water.

In accordance with the invention, a positioning means is provided for normally maintaining the bouyant member 12 in its first or upright position. Thus, a weight 16 serves a positioning function and may take the form of an ordinary lead weight affixed to a vertical section 18 of a body member of the fishing device.

The body member of the device may also vary in form but preferably comprises a bent wire member having a horizontal section or arm 20 formed integrally with the vertical section 18. Thus, generally L-shaped body member is provided and the free end of the horizontal sectional arm 20 is so dimensioned as to extend beyond the bouyant member 12 with the device in its upright position, FIG. 1.

An eye 22 formed at the free end of the horizontal arm 20 by bending the wire back upon itself serves as a line connecting means, Further, it is the presently preferred practice to provide a second eye 24 at the junction of the vertical and horizontal sections 18 and 20 as by looping the wire through 360° to arrange the sections 18 and 20 in approximate perpendicular relationship. The loop 24 is thus approximately centered over the bouyant member 12 and may receive a fishing line 26 which extends leftwardly in FIG. 1 to the rod, reel, etc. of the fisherman and which extends rightwardly through the eye 22 and thence downardly at 28 for attachment of a hook, leader, weights, etc. Preferably, the line 26 is tied about the wire at the eye 22 so as not to freely slide therethrough.

Figure 2:
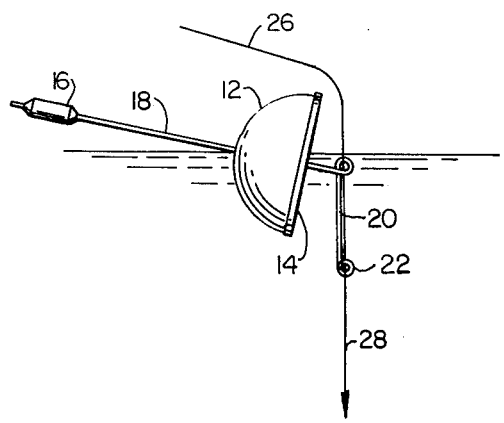
FIG. 2 is a side elevational view similar to FIG. 1 but showing the device in a second or side position.

With the eye 22 offset horizontally or laterally as illusrated, it will be apparent that a substantial mechanical advantage is provided so that a slight downward oull or tug on the line 28 will tend to tip or tilt the device from its first or upright position of FIG. 1 to its second or side position of FIG. 2. The parti-spherical configuration of the lower portion of the bouyant member 12 contributes to the ease of tilting or pivotal action of the device. Thus, even a lazy pull by a fish on the lead and hook will tilt the device and it will assume the FIG.

2 position. In the second position of FIG. 2, the drag surface 14 is rendered operative as mentioned above. If the fish tends to pull vertically downwardly, the device will continue to rotate with the drag surface moving to a downwardly facing attitude and substantial resistance to downward movement of the bouyant member will be provided by the surface. Thus, as the fish pulls, the line portion 28 will be taut and the reactive force of the surface 14 will cause the hook to be firmly set in the mouth of the fish. If the fish pulls angularly rightwardly and downwardly in FIG. 2, the bouyant member 12 may tend to move along the surface of the water and will undoubtedly be more fully submerged than in the FIG. 2 position. Thus, all or substantially all the drag surface 14 will serve its intended function in impeding movement of the member and the hook will again be firmly set in the mouth of the fish. If the fish tends to run leftwardly in FIG. 2, the device will of course reverse its position and a similar action will result. Thus, the hook setting function of the drag surface 14 is operative in movement of the bouyant member 12 through the water in any direction at the urging of the line section 24.

Figure 3:
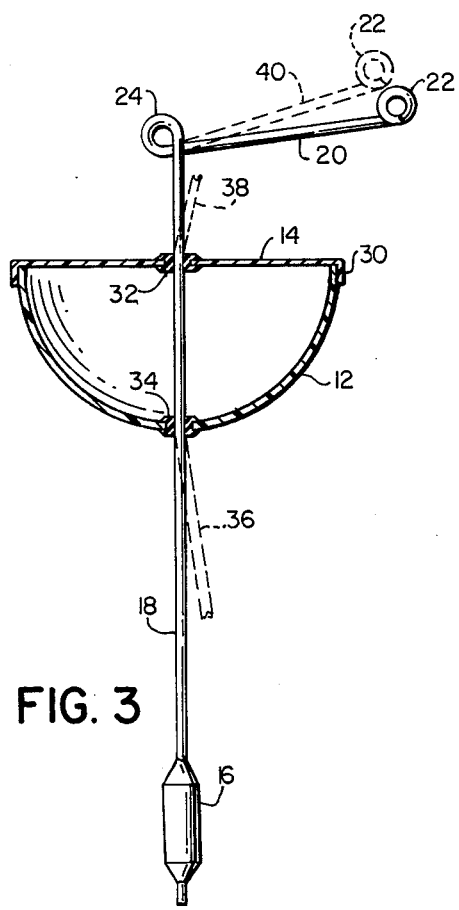
FIG. 3 is a somewhat enlarged vertical sectional view through the improved fishing bob and hook setting device better illustrating the adjustment means.

In FIG. 3, the construction of the bouyant member 12 is illustrated in more detail. As mentioned, the member is semi-spherical in confgiruation and may comprise one-half of a conventional spherical bob. A cover pate provides the drag surface 14 and may comprise merely a flat plate with an annular lip or flange 30 adapted to fit over an open portion of the semi-spherical half section of a conventional bob. The bob is, of course, hollow and may be of the usual plastic consruction.

Mounting of the bouyant member 12 on the vertical wire section 18 is accomplished for vertical adjustment of the member along the section. Thus, a small aperature centrally located boss may be provided in the cover member at 32 and a similar boss may be provided at a lower portion of the semi-spherical member 12 at 34. The openings in the members 32, 34 may be slightly undersized with respect to the diameter of the wire forming the vertical section 18 so as to result in a tight frictional fit. Thus, the bouyant member may be moved vertically to a desired position with a slight manual force and will thereafter remain at such postion for fine tuning of the tilting ir tipping operation of the device. Obviously, with the bouyant member at a relatively low position, the mechanical advantage will be greater and the device will tilt more easily with a lazy pull as might be encountered with very small fish. With the bouyant member 12 moved to an upper position, a slightly heavier pull will be required to effect the necessary tilting operation. Calm or rough water conditions can also be accommodated in the adjustment of the member 12 along the section 18.

It should also be noted that the member 18 is shown beneath the bouyant member 12 in broken line at 36 in a slightly bent condition. Similarly, a slightly bent portion of the wire is illustrated at 38 above the member 12. Obviously, the slight bend in the wire will inhibit any tendency of the bouyant member 12 to inadvertently or accidently slide therealong.

Mounting of the weight 16 on the vertical wire section 18 may also be accomplished in the manner desired by the fisherman. That is, the relative vertical position of the weight 16, the bouyant member 12, etc. can be selected merely by moving the weight upwardly or downwardly. It may be desired to bend a lower portion of the wire section 18 back upon itself in affixing the weight to the wire.

A further adjustment is provided as illustrated by the broken line 40 showing the arm 20 bent slightly angularly upwardly from the FIG. 1 and FIG. 2 positions. With the loop 24 in the wire at the junction of the arm 20 and the vertical section 18, it is a relatively easy manner to bend the arm 20 to any desired position. Obviously, if the wire is bent upwardly as illustrated, a further fine tuning of the tilting action of the device can be achieved. The relative vertical position of the line connecting means or eye 22 and the bouyant member 12 can be thus controlled and it will also be observed that movement of the arm 20 upwardly tends to bring a line section 28 radially inwardly and somewhat closer to the center of the bouyant memeber 12. Thus, the mechanical advantage is changed with a resultant change in the amount of force required on the line section 28 for the desired tilting or tipping action.

Figure 4:
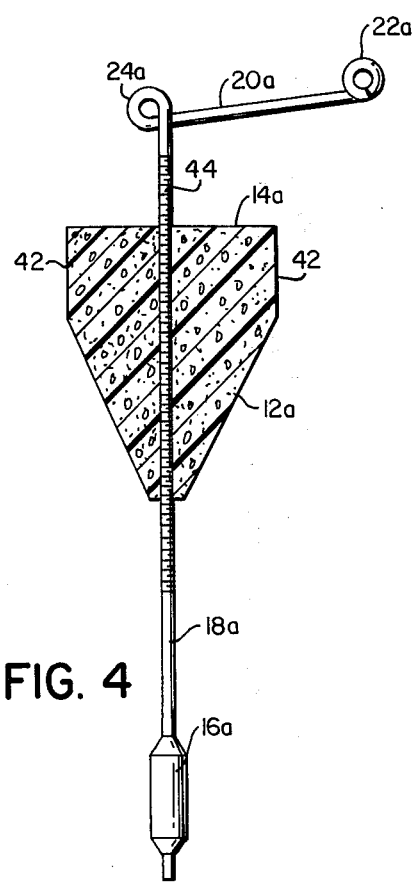
FIG. 4 is a vertical sectional view through an alternative construction of the fishing bob and hook setting device of the present invention, a second form of bouyant member being illustrated therein.

In FIG. 4 a further form of bouyant member 12a is illustrated. The member 12a may be of a solid, lighter-than-water foam plastic construction and varies somewhat in configuration from the member 12. That is, the member 12a takes a frusto-conical configuration and four flats 42, 42 (two shown) may be provided adjacent a top drag surface 14a. In this embodiment of the invention, the wire section 18 is provided with a threaded section 44 which enters the foam plastic of the bouyant member which extends above and below the member, Thus, the member 12a may be rotated in a proper direction to move the member upwardly and downwardly along the wire section 18 and to position the member as desired. Frictional engagement of the member with the threads 44, 44 will then retain the member in its selected vertical position.

From the foregoing, it will be apparent that a fishing bob and hook setting device of extremely simple form has been provided. A simple bent wire member and a bouyant member such as 12 or 12a may be provided and assembled in kit form and the fisherman may attach his own weight 16. With the fishing line threaded through the guide member or eye 24 and connected at the line connecting means or eye 22. the leader, weights, hook may be attached to the line section 28 in the conventional manner. Thereafter, tension on the line 24 will not inadvertently tilt or tip the device since the force will be exerted at a point approximately centrally located above the bouyant member 12. A slight downward pull on the line section 28 will, however, result in an immediate and easy tipping or tilting of the device. When this occurs, the drag surface 14 will be at least partially submerged in the water and will immediately fulfill its hook setting function. The harder the fish pulls, the more severe reactive force will occur at the surface 14 and hook setting will be efficiently achieved. Fine tuning of the device as required to accommodate water conditions or to adjust the ease or difficulty of tilting action may be readily accomplished in the manner indicated.

I claim:

1. A fishing bob and hook setting device comprising a bouyant member having at least one surface adapted to create a substantial drag in movement through water, said member having a first upright position on the surface of a body of water wherein its drag surface inoperative, and a second tipped and at least partially submerged position wherein said drag surface engages with the water for a hook setting operation, a thin elongated generally L-shaped body member having integral vertical and horizontal sections, said vertical section extending through and beneath said bouyant member, and said horizontal section extending laterally above the bouyant member, a positioning weight operatively associated with said body member in vertically spaced relationship beneath the bouyant member for maintaining the member in said first upright position wherein the drag surface is inoperative, line guide means on the body member above the bouyant member, and line connecting means operatively associated with the body member at the free end of said horizontal section above and in horizontally offset relationship with the center of said bouyant member so that a slight downward fish pull on a line connected thereto readily overcomes the effect of said positioning weight beneath the bouyant member and moves said member to its said second and tipped position, said line guide means being approximately centered above said bouyant member for guiding a line from said line connecting means toward the fisherman, the drag surface on the member thereafter serving an immediate firm but gentle hook setting function in movement of the member through the water in any direction.

2. A fishing bob and hook setting device as set forth in claim 1 wherein said line connecting means and bouyant member are adapted for relative vertical adjustment whereby to adjust the slight downard pulling force necessary on the line to tip the bouyant member from its upright position to its side.

3. A fishing bob and hook setting device as set forth in claim 1 wherein said body member is of bent wire construction, and wherein said line connecting means is integral therewith and takes the form of an eye at the free end of the horizontal section thereof.

4. A fishing bob and hook setting device as set forth in claim 3 wherein said body member is adapted for generally vertical adjustment of the line connecting eye by bending said horizontal section upwardly and downwardly as desired at its junction with said vertical body section.

5. A fishing bob and hook setting device as set forth in claim 3 including an eye formed integrally in said body member at the junction of its vertical and horizontal sections and approximately centered above said bouyant member for guiding a line from said line connecting eye toward the fisherman.

6. A fishing bob and hook setting device as set forth in claim 1 wherein said bouyant member is mounted for vertical adjustment on said vertical section of the body member.

7. A fishing bob and hook setting device as set forth in claim 1 wherein said drag surface on said bouyant member is substantially flat.

8. A fishing bob and hook setting device as set forth in claim 7 wherein said bouyant member is hollow and substantially semi-spherical in shape.

9. A fishing bob and hook setting device as set forth in claim 7 wherein said bouyant member is constructed of a lighter-than-water foam plastic.

* * * * *